June 12, 1928.  R. J. POMEROY  1,673,019
METHOD OF PRODUCING COMPOSITE PHOTOGRAPHS
Filed Dec. 19, 1925
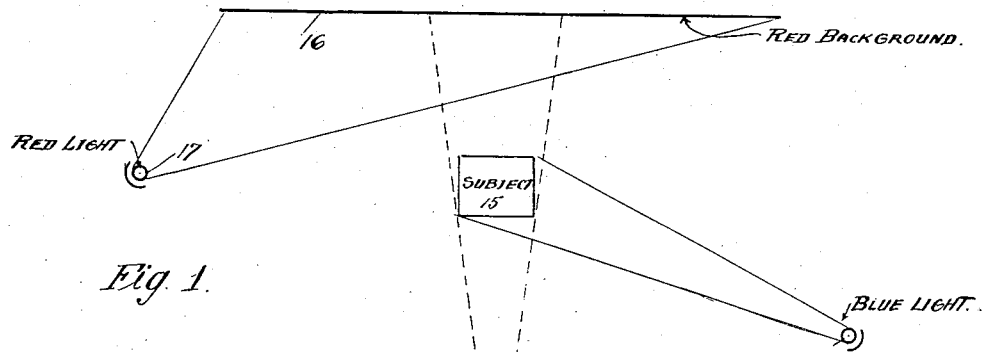
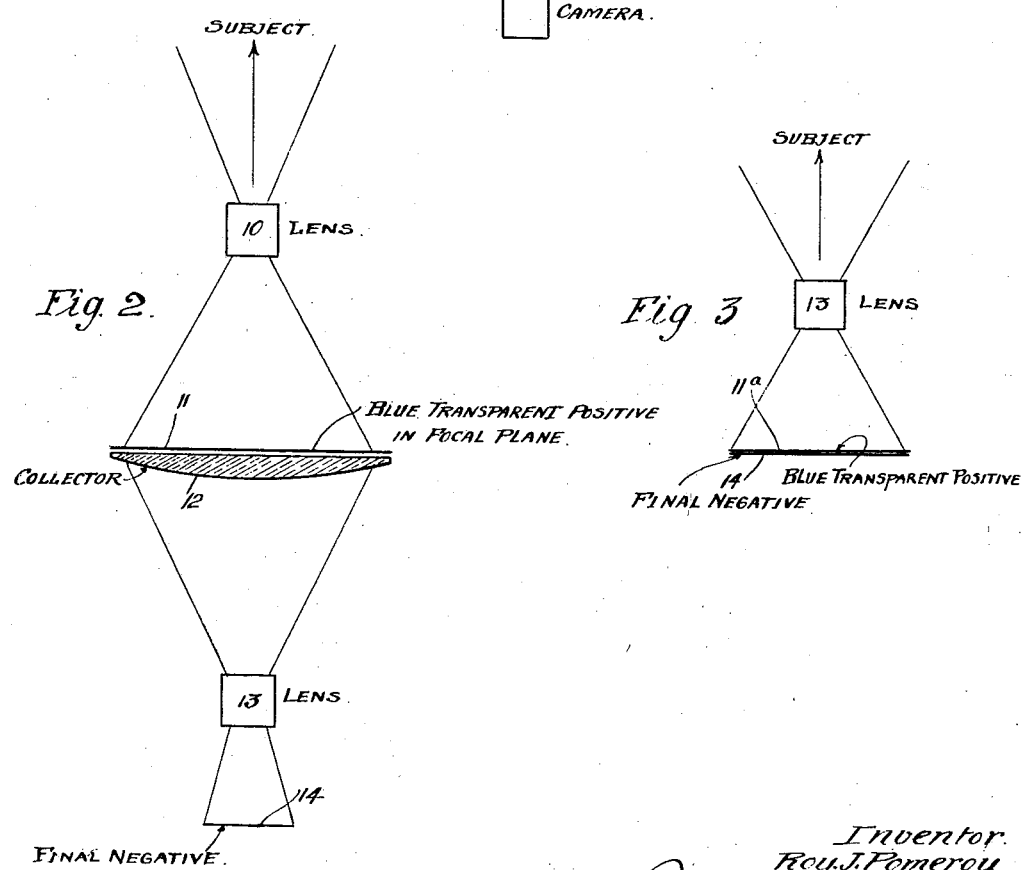

Patented June 12, 1928.

1,673,019

UNITED STATES PATENT OFFICE.

ROY J. POMEROY, OF LOS ANGELES, CALIFORNIA, ASSIGNOR OF ONE-HALF TO FAMOUS PLAYERS-LASKY CORPORATION, OF LOS ANGELES, CALIFORNIA, A CORPORATION OF NEW YORK.

METHOD OF PRODUCING COMPOSITE PHOTOGRAPHS.

Application filed December 19, 1925. Serial No. 76,423.

This invention has to do with the art of producing composite pictures by photography—that is, of producing photographically a picture which contains, for instance, a subject apparently set in a scene or before a background in which the subject is not actually set at the time the original photograph was taken. In motion picture and other photography it is at times highly desirable that a subject be represented in connection with a scene or background of which a picture has been independently taken. Various methods have been devised for the making of such composite pictures, most of them involving in some manner or other what is known as a double exposure—that is, the exposure of a photographic film at one time to the subject or a photograph thereof and at another time to the desired background or a photograph thereof. In some instances in the prior art this double exposure, so-called, has been effected by successive direct exposures of a film to the subject and background, while in other methods such double exposure has involved successive printing exposures of a photographic film to previously taken photographs of the subject and background.

The method contemplated by the present invention is unlike any of the prior methods of which I am aware, primarily in the fact that the present method involves but a single exposure of a final film, that exposure being simultaneously made to both the subject and the desired surrounding scene or background. Generally speaking, this is done by first taking a suitable photograph of the desired scene or background and then producing from that photograph in any suitable manner a transparency that is as nearly as may be of a single elementary color—that is as clearly transparent throughout to light of that color as may be practicable. For instance, the transparency is what may be termed a blue dye-image positive, whose transparency to blue light is nearly or quite uniform, but whose transparency to minus-blue light varies in accordance with the heaviness or lightness of the blue pigment of which the blue transparency is composed.

In making an exposure of a final negative this blue dye-image is placed in a focal plane so that its image is focused upon the final negative; and the subject or action is also focused upon the final negative, illuminated by blue light. This blue light passes through the blue transparent positive without being interfered with thereby; but by use of a red (minus blue) curtain behind the subject or action, all portions of the blue transparency except those parts through which the light from the action passes, are illuminated only by red light. The red light passes through the blue transparency not uniformly over its whole surface, but in such a manner, as, in effect, to transform the blue transparent positive into a black and white positive; and the rays of red light thus passing through the blue transparency cast upon the final negative an image of the scene depicted in the transparency.

How all this is done in detail will be best understood from the following specific description of a preferred method; and although this preferred method is explained merely as illustrative of the invention and is not to be considered a limitation thereon, the invention itself will be best understood from a consideration of such specific procedure. To aid the following specific description, I refer to the accompanying drawings, in which:

Fig. 1 is a diagram representing a typical arrangement by which the method may be carried into effect;

Fig. 2 is a diagrammatic showing of one form of camera apparatus; and

Fig. 3 is a diagrammatic showing of another arrangement of camera apparatus.

As will readily be understood from a consideration of the underlying features of this method, various changes and modifications may be effected without departing from the underlying principles. Thus, at the outset, I may state that the color used in these processes for illumination of the subject and for the transparent positive, on the one hand, and the illumination of the background on the other hand, are, in principle, only controlled by the fact that these two colors should preferably be as nearly as possible complementary. Thus if one color is blue the other would be as nearly "minus blue" as is practicable; and in principle it makes no difference which color is used for illumination of the subject and which is used for the background.

However, in practice, I have thus far found it practicable to use blue as the color for subject illumination and for the transparent positive, and red for the background; and I shall describe the method with those colors so used, but without thereby intending to limit the invention.

For this method a negative of the desired background or scene, if it be a still scene, is made upon a single plate, preferably of large size, and in the ordinary manner. From this negative a positive of similar size is made; but for the purpose of this positive I employ a bichromated gelatin so as to get what is known as a bichromated gelatin image; and in printing the positive from the negative it is preferred to print through the celluloid or other base so that the outer face of the bichromated gelatin remains comparatively soft to be dissolved away by a warm water wash and thus produce the gelatin relief, as well known. Having obtained this gelatin positive, it is next dyed with a suitable dye, and for this purpose I have found that a mixture of naphthol green and what is known as patent blue, is suitable. Naphthol green is a ferrous-sodium salt of nitroso-B-monosulphuric acid; and patent blue is a greenish-blue dye made by sulphonating and oxidizing the result of condensation of m-hydroxylbenzaldehyde with alkyl derivatives of aniline. This mixed dye obtains a good blue color, renders the gelatin image very transparent, and of almost uniform transparency to blue over the whole surface of the positive. The positive as thus prepared has a very transparent blueness over its whole surface, the "depth" of the blueness varying and by that variation showing the image of the background or scene that was originally taken. If this positive be held to the light with a blue filter interposed, the dye image substantially disappears. However the blue color in the deeper or heavier blue parts is transparent and clear. Through these deeper blue parts substantially nothing but pure blue light can pass, while through the lighter blue parts a proportionately larger amount of white light may pass. If this transparent positive be held up to the light with a red (or substantially minus-blue) filter behind it, the transparent blue positive is, in appearance, immediately transformed into a black and white positive, substantially the same in appearance as would be an ordinary black and white positive taken from the original negative and illuminated with red light. This appearance is, of course, due to the fact that through the heavier blue parts only blue light can pass, and the red filter passes substantially no blue light at all. In the lighter parts the red light that passes through the filter can also pass at least partially through the thin blue dye.

This comparatively large blue transparent positive is placed in an optical system in such a manner that it will be located in a focal plane. For instance, as shown in Fig. 2, there is a lens 10 which casts an image of the subject directly upon the plane in which the blue transparency 11 is located. Behind this blue transparency there may conveniently be a collector lens 12; and the lens 13, which corresponds to the ordinary motion picture camera lens, is focused upon the blue transparency and therefore also upon the image thrown by lens 10 upon it. Lens 13 is focused on the final negative 14 which, in this particular case, is illustrated as a motion picture film. It will be understood that the methods here described are just as applicable to still photography as to motion pictures; but I describe them with motion pictures in mind as that art demands the production of composite pictures more than the other. The apparatus indicated in diagram in Fig. 2 may be any ordinary motion picture camera with lens 10 and the support for transparency 11 added to it, and also preferably a collector lens 12.

Using such an arrangement as shown in Fig. 2, the subject, indicated at 15 in Fig. 1, is placed before a background 16, which is preferably of a minus blue color—in other words, of a suitable red color. This background may also be illuminated by light of the same color coming from a source such as is indicated at 17. I have indicated the background as being illuminated by reflection; it will readily be understood that the background might readily be a light transmissive element. The function of the element 16 is merely, as will be seen, to illuminate the blue transparency with red light—so far as the process is concerned, this red background is simply a source of uniformly distributed red light.

The subject 15 (usually in motion pictures a subject including things or persons in motion) is illuminated with blue light from a suitable source, as indicated at 18, the lights being so arranged that no red light falls on the subject and no blue light falls on the background.

Blue light from the subject will pass through the blue transparency 11 substantially equally in all parts of that transparency, due to its uniform transparency to blue over its whole surface. Consequently the image of the subject that is finally thrown on the negative 14 by lens 13 is not interfered with by the varying blueness of the positive; and that image in blue light finally thrown on negative 14 is, substantially, just the same as if the transparent positive 11 were not interposed at all. And the subject, of course, intercepts all red light from the background directly behind the subject. The result is that, as to the subject, the final negative takes an image of the subject uninterfered with by the blue transparency or by the red light coming from the background.

At the same time, the red light from the background illuminates all parts of the transparency 11 not occupied by the image of the subject; and this illumination by red light transforms that blue transparency, in effect, into a black and white positive, as I have expained before. Consequently lens 13, taking red light from the blue transparency, in all parts except that occupied by the image of the subject, casts upon final negative 14 a complete image of all the background or scene surrounding the subject. All this takes place simultaneously at a single exposure, so that final negative 14 has cast upon it an image of the subject, in blue light, surrounded by an image of the background or scene in red light. The final negative thus receives the desired composite picture and upon development it shows that composite picture just as if the subject had been taken in the ordinary manner while actually in the depicted scene.

In order to obtain proper balance between the subject and the surrounding background in the final negative it is, of course, desirable to use a panchromatic film, or even one that has been relatively sensitized to red. And then the proper balance may be obtained by relatively increasing or decreasing the intensity of the illuminations upon the subject and background. By thus controlling the intensities of illumination and, therefore, the actinic values of the images thrown in different colored lights on the final negative, the finally developed picture in that negative may be made to be well balanced.

If the blue positive in any case is not perfectly transparent to blue light (shows a slight image when illuminated with blue light), then a yellow transparent corresponding negative of selected color and tone may be made and registered with the blue transparent positive. Such a yellow transparent negative will compensate for the lack of perfect transparency in the blue. It adds opacity to the light blue portions as regards blue light, and it will also transmit red light in those portions. Such a yellow transparent negative may be made by a process similar to that by which the blue transparent positive is made, suitable dyes being used, as is well understood in the art. The fact that the yellow transparency is a negative causes it to add opacity to the thinner parts of the blue positive without adding any substantial amount of opacity to the heavier parts of the blue positive. Being of a selected yellow color, and thus being capable of partially passing both red and blue light, it will be seen that it will add to the more transparent blue portions just the slight additional opacity to blue that is desired; and at the same time it will change the transparency to red light in those lighter portions but slightly.

Where the background or scene is one containing moving objects, such for instance as wind-blown trees, or a sea, the original negative of the background scene may be made in the ordinary manner in a motion picture camera and be made of standard size. From this original negative the corresponding motion picture positive is made on a bichromated gelatin film to get thereon the bichromated gelatin image as before described, and then this positive is dyed as before stated. Then when the final negative 14 is exposed to the subject or action before the colored background, this blue transparent positive 11$^a$ (see Fig. 3) is simply run in an ordinary camera behind its lens 13 and in front of final negative 14. The final result is the same as before described.

Or, if it is desired to show the action or subject before what is ordinarily known as a moving background (a background that moves behind the subject in panoramic effect for instance), the desired background scene may be taken in large size on a long panoramic strip; and after the blue transparent positive has been made, that positive may be placed in position as shown at 11 in Fig. 2 and moved lengthwise at a constant speed through the apparatus during the time of exposure. The final effect, in that case, would be just as if the subject or action had been taken before the moving panoramic background.

In the processes hereinbefore described it will be seen that one component (the action object in this case) is illuminated with light of a selected color, that the other component (the background positive in this case) is illuminated with light of a relatively minus color; that the two components are so arranged that one component (the action object in this case) blocks out or intercepts the light of the other component (the background positive); and that different parts of the final negative are selectively exposed to the lights from the respective components, or to optical images of the two components, in the two respectively colored lights.

In the particular method herein described, it is the color of the background positive, (the blue transparency) that, in conjunction with the two selected light colors, causes selective exposure of different parts of the final negative exclusively to the two components. The blocking out or interception of the light of one component is accomplished by what may be termed optical superposition of the two components; that is, the two components are, either in the form of Fig. 2 or Fig. 3, arranged on the same optical axis so that light from one passes to or through the other on its way to the final negative, and so that the one intercepts or blocks out the light of the other on its way to the final negative.

In companion cases filed on February 7, 1927 and bearing Serial Numbers 166,301, 166,302, and 166,303, other arrangements and procedures are described for obtaining selectivity of exposure, and also other arrangements whereby a previously taken photograph or other representation or image of both components may be used in the process. As between the present application and said co-pending applications the broad subject matter common to all the specific methods is herein claimed, as well as the specific method herein described; and the said companion applications carry claims covering their specific methods.

I claim:

1. The method of producing a composite photograph, that includes making a transparent image of one of the components in a suitable color, illuminating another component with light of substantially the color of said transparent image, illuminating the remainder of the transparent image, excepting that part through which the second component is being photographed, with light of a substantially complementary color, and exposing a fresh actinic surface to the second mentioned component through the transparent image said actinic surface being sensitive to both said colors.

2. The method of producing a composite photograph, that includes making a transparent image of one of the components in a suitable color, placing said transparent colored image in a focal plane of a camera, illuminating another component with light of substantially the color of the transparent image, and exposing a fresh actinic surface behind the transparent colored image to the other component arranged before a background emitting light substantially complementary in color to that of the transparent image, said actinic surface being sensitive to both said colors.

3. The method of producing a composite negative, that includes making a blue transparent positive of one component, placing said positive in a focal plane of a camera before a fresh negative, sensitive both to blue and to minus-blue light, focusing the camera on the other component arranged before a back-ground emitting minus-blue light, illuminating the second mentioned component with blue light, and exposing.

4. The method of producing a composite negative, that includes making a blue transparent positive of one component, placing said positive in a focal plane of a camera before a fresh negative sensitive to both blue and minus-blue light, focusing the camera on the other component arranged before a background emitting minus-blue light, illuminating the second mentioned component with blue light, correcting any lack of uniform transparency in the blue positive by superposing a yellow transparent corresponding positive, and exposing the negative.

5. The method of producing a composite photograph, that includes making a transparent image of one of the components in a suitable color, illuminating another component with light of substantially the color of said transparent image, illuminating the remainder of the transparent image, excepting that part through which the second component is being photographed, with light of a substantially complementary color, and exposing a fresh actinic surface to the second component through the transparent image and through a transparent negative of the transparent image, said transparent negative being of a color that passes partially the lights of both illuminations, and said actinic surface being sensitive to the light of both illuminations.

6. The method of producing at a single exposure a composite photograph embodying two component parts, that includes exposing a fresh actinic surface to one component, illuminated by light of a selected color, through a transparent colored image of the other component, the color of said transparent image being such as will pass the colored light from said color illuminated component, the said colored transparent image being illuminated during said exposure with light of a color substantially complementary to its own color, and the actinic surface being sensitive to light of both said colors.

7. The method of producing a composite photograph embodying two component parts, that includes making a transparent image of one of the components in a suitable color, illuminating another component with light of substantially the color of said transparent image, illuminating the transparent image with light of a substantially complementary color, said second mentioned component being opaque to the light with which the transparent image is illuminated, and simultaneously photographing said transparent image and said second mentioned component, one in front of the other, onto an actinic surface sensitive to light of both said colors.

In witness that I claim the foregoing I have hereunto subscribed my name this 8th day of December, 1925.

ROY J. POMEROY.